May 7, 1957      D. B. PECK ET AL      2,790,999
PROCESS FOR PRODUCING POROUS POLYTETRAFLUOROETHYLENE FILM
Filed Oct. 20, 1951
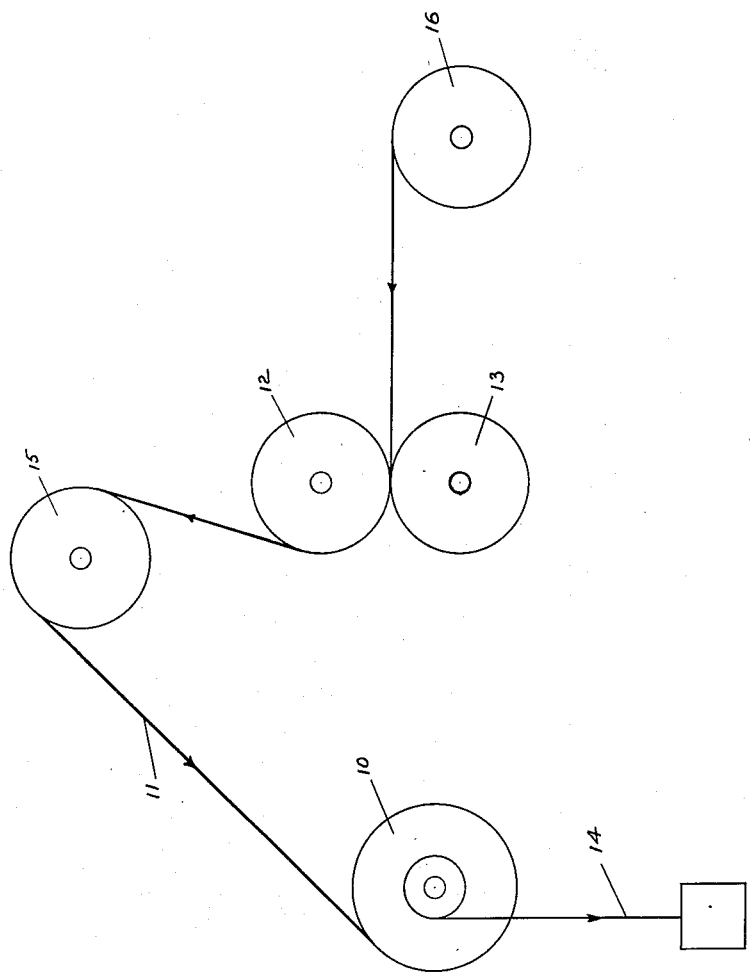
DAVID B. PECK
RALPH A. HAMMANN
HUGH W. KIRKPATRICK
        INVENTORS
BY Arthur G. Connelly
THEIR ATTORNEY

United States Patent Office 2,790,999
Patented May 7, 1957

2,790,999

PROCESS FOR PRODUCING POROUS POLYTETRAFLUOROETHYLENE FILM

David B. Peck, Williamstown, Ralph A. Hammann, North Adams, and Hugh W. Kirkpatrick, Williamstown, Mass., assignors to Sprague Electric Company, North Adams, Mass., a corporation of Massachusetts Application October 20, 1951, Serial No. 252,236

3 Claims. (Cl. 18—56)

This invention relates to improved electrical insulation and more specifically refers to a process of producing porous polytetrafluoroethylene films.

Polytetrafluoroethylene film is by now a very well known dielectric material combining exceptional low electrical loss with exceptional thermal stability. It can be molded under very special conditions to form large cylinders which in turn can be shaved on a lathe to provide continuous lengths of thin films with a minimum thickness of about two mils. This thickness is usually somewhat greater than is desired for use in electrical capacitors, particularly in view of the fact that the film invariably has conducting particles and/or holes. As a result it is necessary to wind at least two films separating each electrode in a capacitor, making the resultant unit quite bulky for its electrical capacity. A further disadvantage resides in the fact that the film is more or less non-porous and can not be impregnated with ease to obtain maximum voltage breakdown in any given capacitor structure.

It is an object of the present invention to overcome the foregoing and related disadvantages. A further object is to produce a thin porous polytetrafluoroethylene film. Additional objects will become apparent from the following description and claims.

These objects are obtained in accordance with the present invention wherein there is produced a polytetrafluoroethylene film of a thickness of less than about two mils and of a porosity between about two percent and about forty percent. In a more restricted sense, this invention is concerned with a polytetrafluoroethylene film of thickness of about one mil and with a porosity of about 15%.

According to our invention, we have found that a novel form of polytetrafluoroethylene can be produced by mechanically disrupting solid polytetrafluoroethylene film under conditions such that a plane running longitudinally is placed under tension, while the plane normal to the film surface is placed under high compression. The order of tension applied is usually from about 1 to about 20 pounds per linear inch of width of film whose thickness is about 2½ mils. The mechanical compression is usually applied as a line contact between rollers and is usually of the order of 25 to about 1,000 pounds per linear inch. The temperature of the process is held below about 70° C. Higher temperatures may result in a modification of the film which is characterized by low or zero porosity.

The process for producing a porous film is best described with reference to the appended drawing.

Here a spool 10 of substantially solid polytetrafluoroethylene film 11 is passed between high compression calender rolls 12 and 13. In order to secure the proper tension on the film, a brake 14 is provided on the supply spool and the film 11 passes over roll 15 to secure tension uniformity. The porous film resulting from the compression between rolls 12 and 13 is wound up on take-up spool 16. This take-up spool applies only light tension on the film.

In addition to the development of film with substantial porosity our process results in a decrease in thickness of the original film by an amount varying from 20 to 100% depending upon the operating conditions and the original film thickness.

The porous film appears slightly opaque and under the microscope appears mechanically disrupted and torn to form angular pores which appear to be aligned along specifically oriented intersecting lines that are at 90° to each other and at 45° to the direction of rolling. As a general rule the thickness of the initial polytetrafluoroethylene film is from about 2 to about 4 mils and the thickness of the porous film is from about 0.8 to about 2 mils. Porosity figures, as expressed by percentage reduction in density, are normally from about 2% to about 40% and preferably in the range of about 15 to 25%.

It will be noted from the description of the process that the compression in the plane normal to the surface of the film is applied substantially in a straight line contact as the film passes through the calender rolls. Operational speeds are usually of the order of from about 10 to about 30 feet per minute, although higher speeds are possible with calender rolls of appropriate diameter. The 10 to 30 feet/minute speeds are readily accomplished with calender rolls of a diameter of six inches.

For electrostatic capacitors, two or more films are used as the dielectric spacers, usually being convolutely wound with aluminum or other metal foils. Because of the porosity of the dielectric spacing material, it is relatively easy to secure thorough impregnation of such capacitors with dielectric liquids. The latter may be materials which solidify upon cooling into the form of a wax, or materials which polymerize in situ upon further or extended heating. Particularly suitable as impregnants for such capacitors are perfluorobutyl amines and ethers and other compounds which are characterized by low surface tension. Other compounds include the hydrocarbons, perfluorohydrocarbons, the silicone oils, and other materials which possess good electrical properties throughout the temperature range in which the capacitor will be operated.

The porous spacers may also be used as electrode spacers in high temperature, electrolytic type capacitors and other electrical devices. Strong corrosive acid and basic electrolytes can be used without attack upon the spacer material; thus, for example, the material may be used as a spacer to separate the anode and cathode in a high temperature tantalum capacitor which is to be impregnated with sulfuric acid as an electrolyte.

Another use for the porous dielectric film is in the fabrication of transformer coils, motors and other electrical devices in which a thin flexible spacer capable of impregnation and possessing outstanding high temperature characteristics is desired.

As a specific example of the preparation of a porous film in accordance with our invention the following example is given:

Polytetrafluoroethylene film, having a thickness of 2.2 mils and a width of 2 inches, is processed according to the technique heretofore described. Referring to the appended drawing, the tension applied to the film 11 by means of brake 14 is 8 pounds. The pressure exerted between the film and the calender rolls 12 and 13 is 8,000 pounds per square inch. The six inch diameter calender rolls are operated at a speed of 20 feet per minute, while the temperature of the rolls is maintained at 20° C. The tension applied to the processed film on the take-up spool 16 is 0.25 pound. The porous polytetrafluoroethylene film thus produced has a thickness of 1.2 mils and a porosity of 15%.

What is claimed is:

1. A process for producing polytetrafluoroethylene film having a thickness of about 1.2 mils and a porosity of about 15% which comprises applying a tension of 4 pounds per linear inch of width to a solid polytetrafluoroethylene resin film about 2½ mils thick while at the same time applying compression on the film in the plane normal to said film on the order of about 8000 pounds per square inch at an ambient film temperature below about 70° C.

2. The process for producing porous tetrafluoroethylene films which comprises applying a tension of from about 1 to about 20 lbs. per linear inch of width to a solid polytetrafluoroethylene film of less than about four mils thickness while applying compression on the film in a plane normal to said film of at least about 2,000 lbs. per square inch, said compression being effected by passage of said solid polytetrafluoroethylene film through high compression calender rolls at an ambient film temperature below about 70° C.

3. A process for producing porous polytetrafluoroethylene films which comprises applying a tension of from about one to about twenty pounds per linear inch of width to a solid polytetrafluoroethylene film not more than about four mils in thickness while applying compression on the film in a plane normal to said film of at least 2000 pounds per square inch at an ambient film temperature below about 70° C.

References Cited in the file of this patent
UNITED STATES PATENTS

| | | |
|---|---|---|
| 2,068,456 | Hooper | Jan. 19, 1937 |
| 2,294,966 | Dreyfus | Sept. 8, 1942 |
| 2,406,127 | Alfthan | Aug. 20, 1946 |
| 2,440,190 | Alfthan | Apr. 20, 1948 |
| 2,540,962 | Puppolo | Feb. 6, 1951 |
| 2,578,522 | Edgar | Dec. 11, 1951 |
| 2,642,625 | Peck | Jan. 23, 1953 |